UNITED STATES PATENT OFFICE.

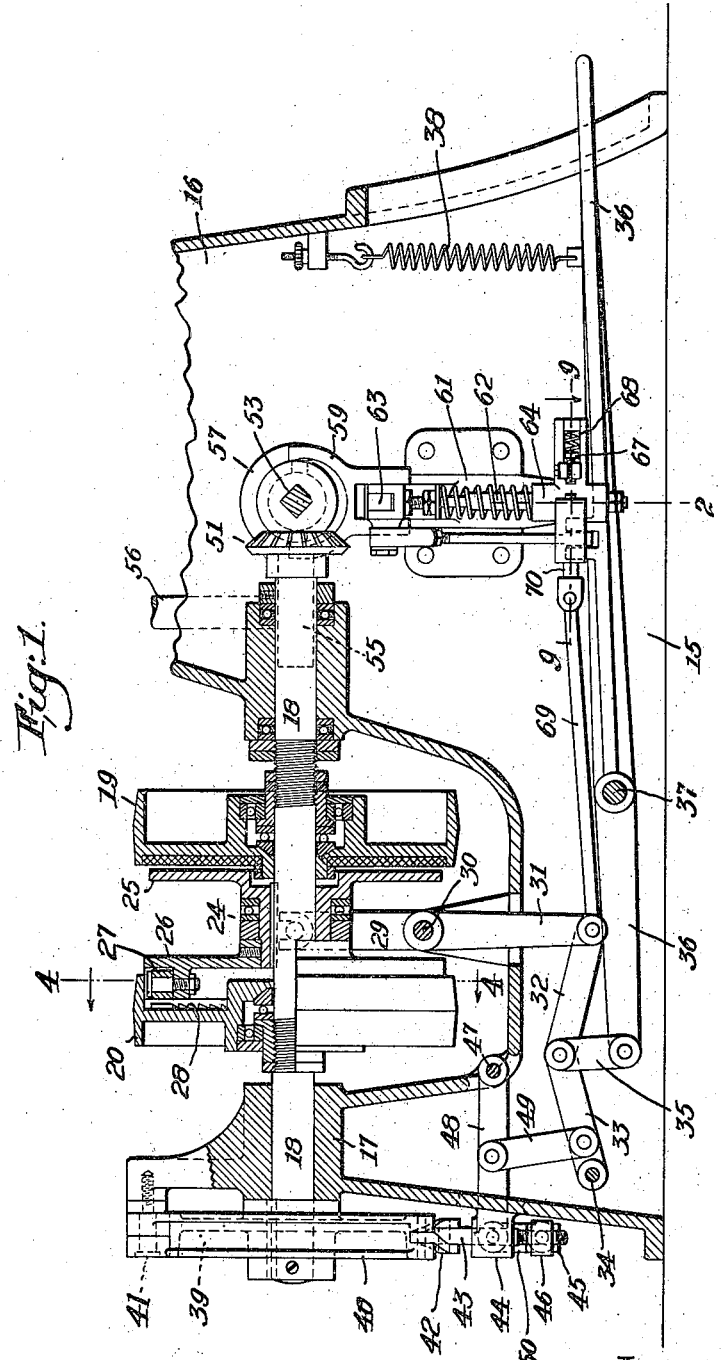

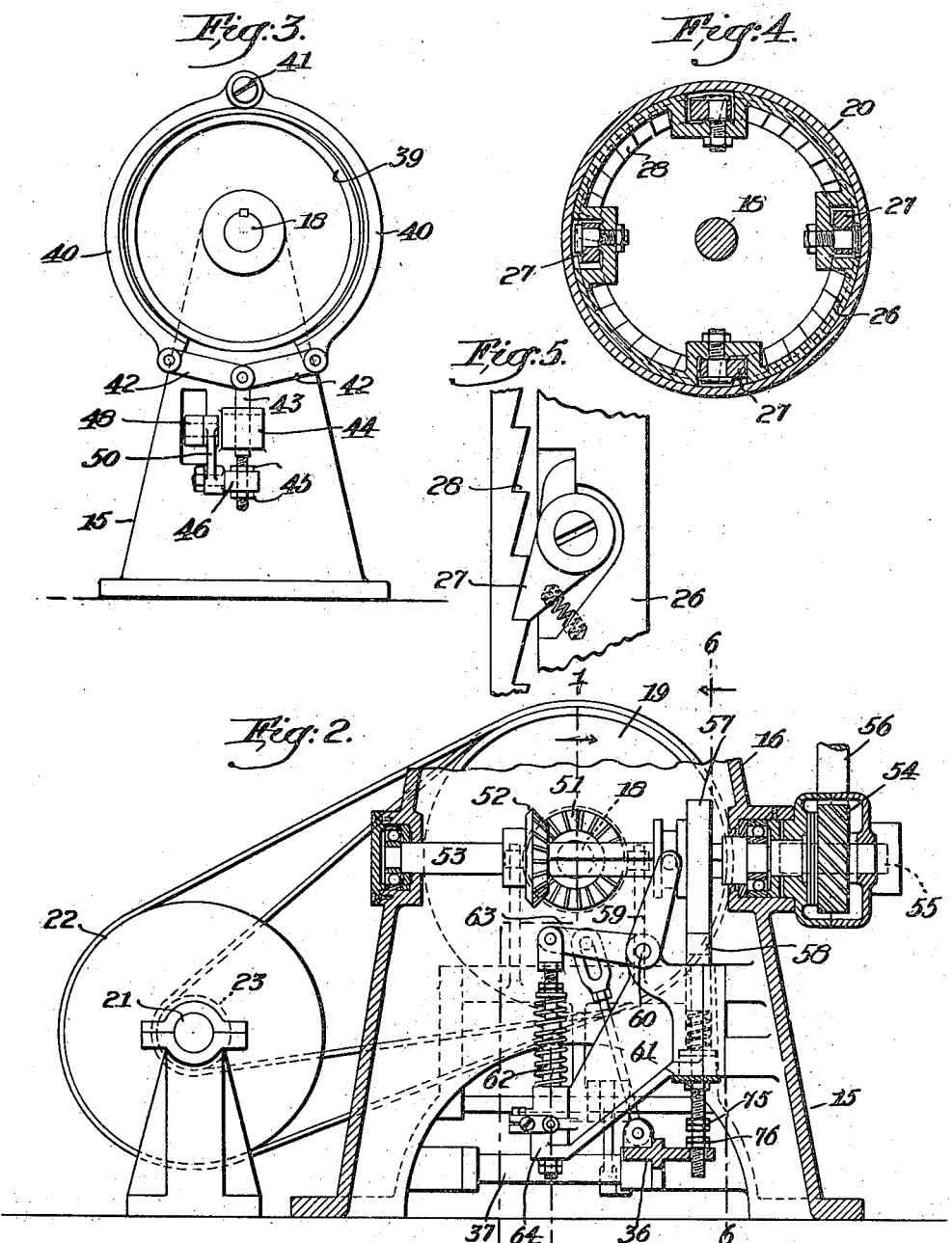

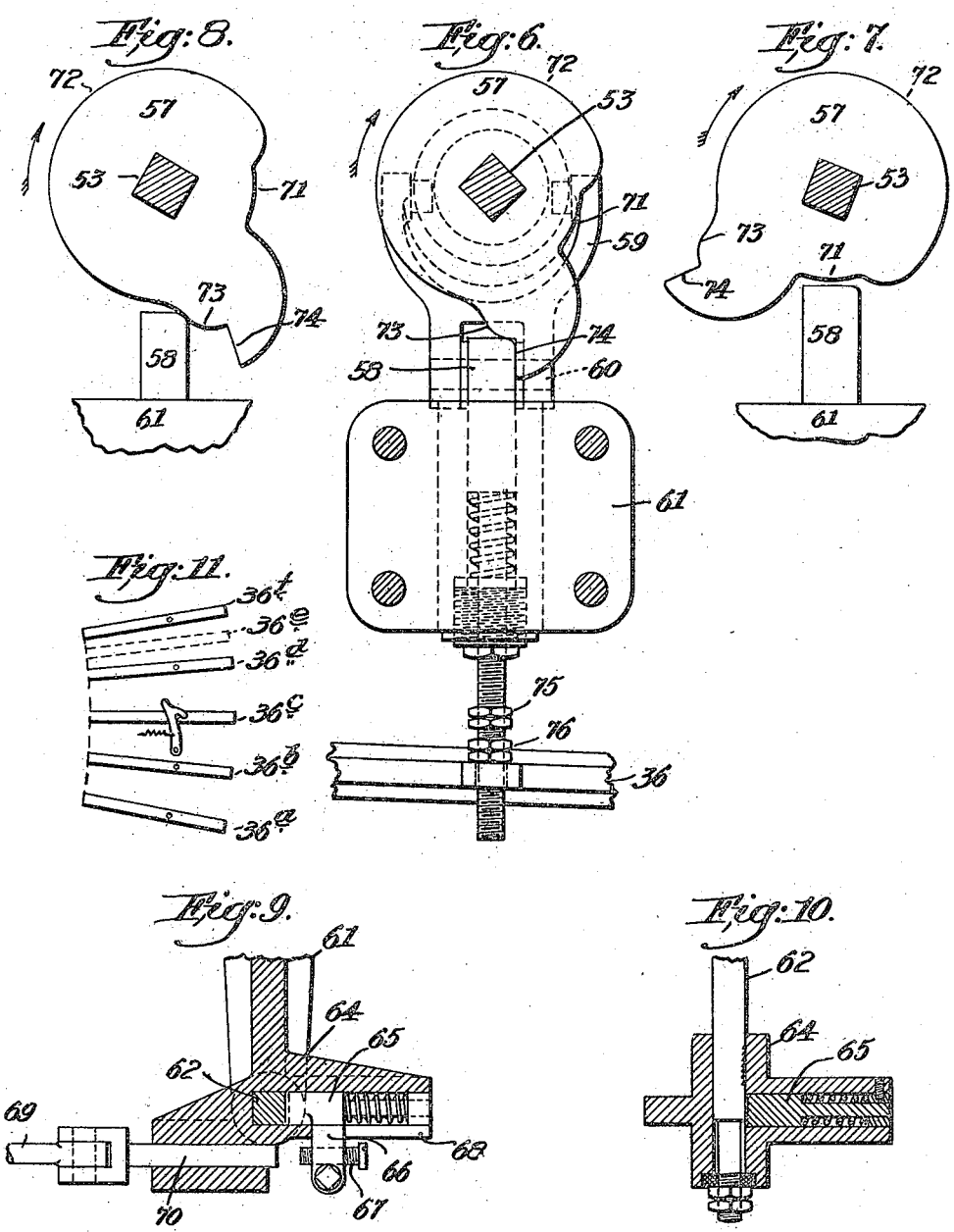

AUGUST R. SCHOENKY, OF SOMERVILLE, MASSACHUSETTS, ASSIGNOR TO REECE SHOE MACHINERY COMPANY, OF BOSTON, MASSACHUSETTS, A CORPORATION OF MAINE.

DRIVING AND STOPPING MECHANISM.

1,243,986.   Specification of Letters Patent.   Patented Oct. 23, 1917.

Application filed August 11, 1916. Serial No. 114,386.

*To all whom it may concern:*

Be it known that I, AUGUST R. SCHOENKY, a citizen of the United States of America, and a resident of Somerville, in the county of Middlesex and Commonwealth of Massachusetts, have invented certain new and useful Improvements in Driving and Stopping Mechanisms, of which the following is a specification.

This invention relates to driving and stopping mechanism for power driven machines in which high or destructive momentum is present due to the weight or high speed of the rotating parts, and wherein the starting and stopping of the same are very frequent occurrences.

The main object of this invention is to provide for the stoppage of such a machine so as to insure a final predetermined angular position of the driven shaft thereof, without shock, quickly, and in an easy and positive manner. It is a further object of this invention to accomplish the above in an automatic manner with the least possible attention or skill on the part of the operator.

It is a further object of this invention to provide means to disengage the high speed power from the shaft of a machine and to apply retarding action to the said shaft, and to position the low speed positive drive mechanism for instant action when called upon. This position of the parts will be maintained until just before the final angular position of the shaft has been reached, when the retarding means will be released, and immediately thereafter the low speed positive drive will be disengaged and the final stopping mechanism will be brought into play.

Further objects of the invention will be more fully pointed out in the description hereinafter given.

For the purpose of illustrating the invention, one preferred form thereof is illustrated in the drawings, this form having been found to give satisfactory and reliable results, although it is understood that the various instrumentalities of which the invention consists can be variously arranged and organized, and that the invention is not limited to the precise arrangement and organization of these instrumentalities as herein shown and described.

Of the drawings:—

Figure 1 is a left elevation partly in section on the plane 1—1 of Fig. 2 of a portion of a machine containing a driving and stopping mechanism embodying the present invention.

Fig. 2 is a front elevation of the mechanism shown in Fig. 1, with the machine frame or case shown in section to better disclose the invention.

Fig. 3 is a part left elevation viewing Fig. 1 showing the brake or shaft retarding means and some of its connections.

Fig. 4 is a section on the line 4—4 Fig. 1.

Fig. 5 is an enlarged detail in left elevation viewing Fig. 4 of some of the parts of the slow speed positive drive in engaged position.

Fig. 6 is a right elevation of certain parts of the mechanism, taken partly in section on the plane 6—6 of Fig. 2.

Figs. 7 and 8 are similar views showing the parts in different stages of operation.

Fig. 9 is a detail section on the line 9—9 Fig. 1.

Fig. 10 is a detail section on the line 10—10 Fig. 2.

Fig. 11 is a diagram of the pedal control action.

Similar characters designate like parts throughout the several figures of the drawing.

With the exception of Figs. 5-7 and 8 the drawings show the parts in their position after the machine has been stopped. In this present invention it will be understood that the initial action for stoppage is caused by the operator, and the subsequent actions are under the control of a driven shaft of the machine to which this invention is to be applied.

A pedal or manually operated lever is moved by the operator when it is desired to stop the machine, such movement disengaging the high speed power from the driven shaft and applying retarding means thereto, such for instance as a band brake.

At the same time, the low speed positive drive devices are positioned for instant action and will engage for operation when the speed of the driven shaft has been retarded to that of the low speed drive devices.

Since the time in which the low speed drive is in operation is extremely short and to eliminate momentum as much as possible, it is deemed advisable to continue the retarding action until just before the low speed is disengaged, which immediately precedes the final positive stoppage of the shaft.

The release of the retarding means and the disengagement of the low speed drive as well as the final stoppage of the shaft are automatically obtained through the medium of a cam or control device mounted on the driven shaft.

Referring to the drawings.

The base 15 has upstanding therefrom the post or column 16 of suitable size and construction as to receive the head or operative parts of the machine to be mounted thereon but not shown herein.

Journaled in the bearings 17 and the post 16 is the main driven shaft 18 of a stitching or other machine which is to be driven and stopped frequently during the operation thereof. Loosely mounted on the shaft 18 is a pulley 19 to be hereinafter known as the high speed pulley, and the pulley 20 to be hereinafter known as the low speed pulley.

A counter shaft 21 has fast thereon the pulleys 22—23 belted to the high and low speed pulleys 19—20 respectively.

Splined to the shaft 18 and slidable axially thereon is a clutch member 24 provided with a disk 25 adapted to engage the face of the high speed pulley 19 see Fig. 1.

At its left end the clutch 24 has a disk 26 to which spring pressed pawls are pivotally mounted see Figs. 1, 4 and 5.

The low speed pulley is provided with ratchet teeth as at 28 adapted to be engaged by the pawls 27 at certain times.

The mechanism employed to slide the clutch 24 to its various positions consists of a bifurcated lever 29 pivoted at 30 to the base 15, and having its depending arm 31 pivotally attached to the link 32 which in turn is pivoted to the swinging arm 33 fulcrumed at 34 in the base 15. The upper ends of the lever 29 are engaged with the studs of a loose ring surrounding the sleeve of the clutch 24.

The link 32 and the arm 33 form a toggle connection, the breaking joint of which has a link connection 35 with the left end of a lever or pedal 36 suitably fulcrumed at 37 to the base 15.

The pedal 36 is at times under the control of a strong spring 38, see Fig. 1. It is obvious that the movement of the pedal 36 downwardly will cause the clutch 24 to engage the high speed pulley 19. The reverse or complete upward movement thereof would cause the clutch to disengage from the high speed pulley and slide the disk 26 and the pawls 27 into engaging position with the teeth of the low speed pulley 19 and at the same time apply the brake or shaft retarding device.

A third position of the pedal 36 and the one shown in the drawing places the clutch 24 in such position that neither of the pulleys 19—20 are engaged and the machine is in stopped position.

In this invention a retarding mechanism in connection with the shaft 18 is employed, that is put in operation directly after the disengagement of the high speed pulley 19 from the clutch 24, the same positioning the pawls 27 for operative engagement with the low speed pulley 19.

Fast on the shaft 18 at its left end see Figs. 1 and 3 is a brake drum 39 loosely surrounding which is a two part brake band 40 pivoted at 41 to an upward extension of the bearing 17.

The lower ends of the band 40 are connected by toggle links 42 which are in turn connected to a pin 43 slidably mounted in a boss 44 of the base 15.

The lower end of the pin 43 is threaded to receive the adjusting nuts 45 between which, and loosely surrounding the pin 43, is the adjustable collar 46.

Fulcrumed to the base 15 at 47 is a swinging arm 48 connected to the arm 33 by the link 49 and to the collar 46 by means of the link 50.

It will be evident that the upward movement of the pedal 36 through the action of the spring 38 and the link and lever connections will cause the band 40 to be tightened about the drum 39, and thereby quickly, and without shock, retard the rotation of the shaft 18 sufficiently to reduce its speed to that of the low speed pulley 20 so that the pawls 27 will engage the teeth 28 of the low speed pulley 20 and thereafter for a limited time the shaft 18 will be driven by such engagement.

The stages of the stopping operation just described have been so far under the control of the operator through the pedal 36. The final operations of stopping which are automatic in their action will now be explained.

Fast to the shaft 18 at its right end see Figs. 1 and 2 is a bevel gear 51 meshing with a similar gear 52 fast on the cross shaft 53 which has suitable bearings in the base 15.

At its right end Fig. 2 the shaft 53 has fast to it a spiral gear 54 meshing with a similar gear 55 fast on the upright shaft 56 leading to the machine head not shown.

Slidable axially on the squared portion of the cross shaft 53 is a control or stop cam 57 adapted to be shifted into and out of operative position with a spring pressed cam follower 58 to be further described.

The cam 57 is provided with a grooved collar adapted to be engaged by roller studs in the ends of a forked bell crank lever 59 pivoted at 60 to a bracket 61 fast on the base 15, see Fig. 2.

The bell crank 59 and consequently the control cam 57 are shifted into the position shown in Fig. 2 by means of a spring pressed spindle 62 pivotally attached to the arm 63 of the bell crank 59 its lower end being slidable in a bearing 64 of the bracket 61.

The spindle 62 is provided with suitable adjusting and stop nuts to regulate the compression of the spring and the upward throw of the spindle respectively.

Viewing Fig. 10 it will be seen that the squared shank of the spindle 62 has teeth cut in one side thereof adapted at times to be engaged by the toothed end of a spring pressed plunger 65 slidable in an extension forming part of the bearing 64.

The said plunger 65 has an outwardly extending portion 66 into which is threaded and clamped the adjustable screw 67 a guiding slot 68 being provided in the extension for the said portion 66.

Pivoted to the lower end of the lever or arm 29 is a link 69 its right end being in turn pivoted to a plunger 70 adapted to at times engage the screw 67 and move the toothed plunger 65 out of engagement with the spindle 62 thereby allowing said spindle to assume the position shown in Fig. 2 by the expansion of its spring. The control cam 57, see Figs. 2-6-7 and 8, is of peculiar construction, it having a depression or cut away portion 71, to allow it to be shifted into operative position over its follower 58, a concentric or guard portion 72, followed by a raising portion 73, and lastly a final stop shoulder or abutment 74.

It will be noted that the lower end of the follower 58 is threaded to receive adjustable stop and contact nuts 75—76 respectively, and passes loosely through a hole provided therefor in the pedal 36 the purpose of which will be hereinafter explained.

During the normal running of the machine the cam 59 will occupy a position on the shaft 18 to the left of its follower 58 and said follower will occupy its highest position shown in Fig. 7. As previously explained when the pedal 36 is depressed to its lowest position as indicated at 36ª in the diagram Fig. 11 the clutch 24 will have engaged the high speed pulley 19 and the machine will be in operation.

When, however, the operator desires to stop the machine the pedal 36 is allowed to rise under the action of the spring 38 and in so doing passes through the several positions indicated in Fig. 11, 36ª, for instance indicating the lowermost position of the pedal 36 with the machine in full operation.

At 36ᵇ the high speed clutch will be disengaged remaining so during the rest of the upward movement of the pedal 36.

As it is necessary at times to turn a machine over by hand for necessary adjustment or repairs, a convenient position of the pedal 36 for this purpose is indicated at 36ᶜ where the said pedal may be locked, leaving both the high and low speed clutches as well as the shaft retarding device out of operative position.

Further movement of the pedal upward into the position indicated at 36ᵈ the retarding device or brake will be applied, at which time the pawls 27 will have reached the ratchet engaging position but are not engaged therewith. The dotted line position 36ᵉ indicates the position when the control cam or stop is released.

At this point if the depression 71 of the cam 57 is in register with the follower 58 the said cam will be permitted to occupy its operative position over the said follower.

If, however, the said depression and follower 58 do not register, the cam 57 will be retarded in its sliding movement by means of its guard position 72 meeting the side of the follower 58 and will so remain until said depression 71 and follower 58 do register.

At 36ᶠ the pedal 36 has reached its highest swing at which time the low speed control and the retarding device or brake are in full operation.

Meanwhile the cam 57 has been positioned to slightly depress the follower 58.

At the position indicated at 36ᵉ the arm 31 will have moved the link 69 and pin 70 to the right, see Figs. 1, 9 and 10 to cause the said pin 70 to meet the screw 67 and force the toothed plunger 65 out of engagement with the spindle 62. The spring surrounding the spindle 62 will now expand and through the bell crank 59 will force the cam 57 to the right viewing Fig. 2. As previously explained, the cam will be held from its complete lateral movement by the follower 58 if the cam depression 71 should not register therewith.

At this time the shaft 18 and the cam 57 are being rotated but at a gradually reducing speed and such speed will continue to be reduced until the shaft has arrived at the same speed as the low speed drive member.

When the depression 71 has arrived opposite the follower 58 the cam will complete its movement thereover and in its rotation its guard portion 72 will ride over and slightly depress the plunger 58.

This relative position of the cam and follower continues for approximately three quarters of a revolution of the cam 57, giving ample time for the retarding of the shaft to the required speed, for the low speed drive to engage and positively rotate the shaft 18 a distance equal to that required to bring the shaft into or approximately its final stopping position.

The action of the cam 57 depressing the plunger 58 has a slight retarding effect on the shafts 53—18 which is used to advantage at the time of final stoppage of said shafts.

When the raised part of the cam 73 has reached the follower 58 and just before the shoulder 74 reaches the follower 58, the said follower is further depressed against the action of its spring and the contact nuts at its lower end will engage the pedal 36. The pedal 36 will now in turn be depressed and on its downward movement will first release the brake band 40 and immediately thereafter the pawls 27 will be withdrawn from the teeth 28.

Closely following the withdrawal of the pawls 27 the shoulder 74 will meet the follower 58 and a positive stoppage of the shafts 18—53 will occur with the lever 36 in its mid or neutral position leaving the high and low speed drives and the retarding device out of operation.

It will be understood that the several connections controlling the stopping mechanism will be so arranged and adjusted that the below-enumerated performances thereof will first eliminate the high speed drive, apply the brake to eliminate destructive momentum and at the proper time cause the low speed drive to become effective. The brake mechanism must of necessity begin its action and reduce the high speed of the driven shaft to that of the low speed drive before said low speed drive becomes operative even though the said low speed mechanism is in operative position.

So too the brake mechanism may be released prior to the disengagement of the low speed drive to insure a positive movement of the shaft to approximately its final stopping position. The low speed drive in its turn must be disengaged just prior to the engagement of the cam shoulder 74 and follower 58.

Such arrangement of the parts insures the operation thereof in a positive and easy manner, dependence upon the momentum of the machine not being necessary or even considered in the proper performance of the stopping devices.

From the foregoing it will be readily seen that it is an important feature of this invention that the speed of the driven shaft shall be reduced to the speed of the positive low speed drive before the low speed drive becomes effective.

It is also a feature of this invention that the speed reducing medium shall be operated independently of the low speed drive devices, as in the present instance by the action of a brake after the high speed has been thrown out.

It is believed that the many advantages of this invention will be fully understood from the foregoing description.

The invention hereinabove described may be said to be a stop motion for high speed power driven machines which comprises a braking means for reducing the speed of the shaft of the machine before its stoppage, together with a slow drive means for driving the shaft by power at a certain low or reduced speed toward or to the final predetermined stopping position. The slow drive means is one which operates through a special kind of clutch such as a pawl and ratchet that is engageable to drive but not to retard the shaft. The pawl and ratchet clutch is incapable of retarding. As a result the slow drive means comes into effect at that time during the braking action when the shaft speed has been lowered to the reduced speed, that is, the speed of the slow drive means. The slow drive means is thereafter disengaged at a suitable point to enable the shaft to be stopped in a predetermined position. A final stop device may be employed but impact is not always necessary and, indeed, the speed reducing brake may be left in effect throughout and after the slow drive so that on disengagement of the latter the shaft is finally stopped in a definite position.

I claim:

1. In a driving and stopping mechanism for power operated machines, the combination, of a high speed member; a low speed member; a driven shaft; a retarding device operable thereupon; a shiftable member adapted to be moved toward and from said high and low speed members; means carried by said shiftable member adapted to positively engage said low speed member; and control means for said shiftable member independent of said shaft, said means effecting the separation of the shiftable member and the high speed member, and applying the retarding device to said shaft prior to the positive engagement of said means carried by the shiftable member, and said low speed member.

2. In a driving and stopping mechanism for power operated machines, the combination, of high and low speed drive means operable in the same direction; a driven shaft; retarding means operable upon said shaft and adapted to act independently of said low speed drive means; and means independent of said shaft to disengage the high speed and apply the retarding means, and to position the low speed drive means for operation prior to the actuation of the retarding means.

3. In a driving and stopping mechanism for power operated machines, the combination, of high and low speed drive means; a driven shaft; retarding means operable upon said shaft; means independent of said shaft to disengage the high speed and apply the retarding means and to position the low speed drive means for operation prior to the actuation of the retarding means; a final stop device; and automatic means to successively release the retarding means and disengage the low speed drive prior to the final stoppage of the shaft.

4. In a driving and stopping mechanism for power operated machines, the combination, of high and low speed drive means adapted to operate in the same direction; a driven shaft; a stop for said shaft; retarding means operable independently of said low speed drive means upon said shaft; single means under the direct control of the operator to successively disengage the high speed, apply the shaft retarding means, and position the low speed drive means for operation prior to the actuation of the said retarding means; and automatic means to successively release the retarding means, disengage the low speed drive means, adjust the operator's control means to neutral position, and cause a final stoppage of the driven shaft.

5. In a driving and stopping mechanism for power driven machines, the combination of a high speed member; a low speed member; a driven shaft; a high speed friction clutch and a low speed positive clutch revolubly mounted upon said shaft; a brake mechanism adapted to operate directly on said shaft; and means to move said clutches into and out of operative position with the said speed members whereby the shaft will be first retarded and thereafter will be positively driven at a reduced speed in the same direction.

6. In a driving and stopping mechanism for power driven machines, the combination, of a high speed friction clutch; a low speed positive clutch normally retained in disengaged position; a driven shaft; a brake thereon; means externally of the shaft to disengage the friction clutch and position the positive clutch for operation prior to the braking of the shaft; and means to cause the operation of the low speed clutch positive at a predetermined speed of the driven shaft.

7. In a driving and stopping mechanism for power driven machines the combination, of a high speed drive means, a low speed drive means; a driven shaft; retarding means operable independently of said low speed drive means upon said shaft; means to disengage the high speed drive means and apply the retarding means; and means to thereafter engage the low speed drive means to drive the said shaft in the same direction at a predetermind speed of said shaft.

8. In a driving and stopping mechanism for power driven machines, the combination, of a high speed drive means; a low speed drive means; a shaft; a brake operable thereon; a controller for said high and low drive means adapted to disengage the high speed drive means, apply the brake, and position the low speed drive means for operation; and means to thereafter automatically release the brake, disengage the low speed drive, adjust the said control to neutral position and positively stop the said shaft at a predetermined angular position.

9. In a driving and stopping mechanism for power driven machines the combination, of a high speed drive means; a low speed drive means; a driven shaft; retarding means operable independently of said low speed drive means upon said shaft; means to disengage the high speed drive means, position the low speed drive means and actuate the retarding means whereby the speed of the shaft is reduced a predetermined amount; and means to thereafter engage the low speed drive means at said predetermined speed of the shaft.

10. In a driving and stopping mechanism for power driven machines the combination, of a high speed drive; a low speed drive; a driven shaft; a brake thereon operably independent of said low speed drive; means common to said high speed drive and said brake adapted to disengage said high speed drive and set said brake; and low speed drive means adapted to operate to drive the shaft in the same direction after the said brake has been set.

11. In a driving and stopping mechanism for power driven machines, the combination, of a high speed drive; a low speed drive means; a driven shaft; a brake thereon; means to shift from high to low speed, said means first positioning the low speed drive and then setting the brake; means to operate the low speed drive after said brake is set, and means to thereafter disconnect said low speed drive prior to the final stoppage of said shaft.

12. In a driving and stopping mechanism for power driven machines, the combination, of a high speed drive; a continuously rotating low speed positive drive; a driven shaft; retarding means operable thereon independently of said low speed drive; means to shift from high to low speed drive position the low speed drive and operate the retarding means; means to positively engage the low speed drive at a predetermined speed of the shaft; and means to disengage the low speed positive drive and thereafter stop said shaft at a predetermined angular position.

13. In a driving and stopping mechanism for power driven machines, the combination, of a high speed drive; a low speed drive; a driven shaft; a speed control; a brake operable independently of the low speed drive adapted to reduce the speed of the shaft to a predetermined amount after the high speed has been thrown out; means subject to the reduced speed of the driven shaft to operate the low speed drive at a uniform predetermined speed; means to disengage said low speed drive; and means to positively stop the shaft at a predetermined angular position.

14. In a driving and stopping mechanism for power operated machines, the combination, of an operating shaft; continuously rotating high and low speed driving mechanisms therefor; a retarding device operable upon said shaft independently of said driving mechanisms; means to disconnect the high speed mechanism from the shaft and subsequently apply the retarding mechanism thereto; means to positively engage the low speed mechanism to the shaft when sufficiently retarded; means to disengage the low speed drive means; and means to thereafter positively stop the shaft at a predetermined angular position.

15. In a driving and stopping mechanism for power operated machines, the combination, of an operating shaft; high and low speed drive means therefor; a brake operable independently of said drive means upon said shaft; manually operated means to disconnect the high speed drive from said shaft and subsequently apply the brake thereto; means to positively engage the low speed drive means to said shaft at a predetermined speed of said shaft after the brake has been applied; and automatic means to disengage said low speed drive and stop the said shaft at a predetermined angular position.

16. A stop motion for high speed power driven machines, comprising in combination, braking means for reducing the speed of the machine shaft before its stoppage, slow drive means for power driving the shaft at a reduced speed toward a predetermined stopping position, said slow drive means operating through a one way driving clutch, which is engageable to drive but not to retard the shaft, whereby during the braking action the slow drive means comes into effect when the shaft speed is lowered to the reduced speed, and means for disengaging the slow drive means at a suitable point to enable the shaft to be stopped in a predetermined position.

17. A stop-motion for high speed power driven machines comprising in combination, a retarding means which is normally inoperative but adapted to be rendered operative, when the machine is to be stopped, for quickly reducing the speed of the machine shaft; a slow driving means for power-driving the shaft at a speed materially less than the full speed thereof, said slow driving means constructed to act on the shaft through a connection which is engageable to drive but not to retard the shaft, whereby the slow driving means comes into effect automatically when the shaft speed has been retarded to that of the slow driving means; and means for disengaging the slow driving means before the final stoppage.

18. A stop-motion for high speed power driven machines comprising in combination, a retarding means which is normally inoperative but adapted to be rendered operative, when the machine is to be stopped, for quickly reducing the speed of the machine shaft; a slow driving means for power-driving the shaft at a speed materially less than the full speed thereof; means for causing the operative engagement of the slow driving means during the rotation of the retarded shaft whereby the latter is continued in rotation toward the final stopping point, and for subsequently disengaging the slow driving means.

19. A stop-motion for high speed power driven machines comprising in combination, a retarding means which is normally inoperative but adapted to be rendered operative, when the machine is to be stopped, for quickly reducing the speed of the machine shaft; a slow driving means for power-driving the shaft at a speed materially less than the full speed thereof, said slow driving means constructed to exert on the shaft only a forward driving force, whereby the slow driving means comes into effect automatically when the shaft speed has been retarded to that of the slow driving means; and means for disengaging the slow driving means before the final stoppage.

20. A stop-motion for high speed power driven machines comprising in combination, a retarding means which is normally inoperative but adapted to be rendered operative, when the machine is to be stopped, for quickly reducing the speed of the machine shaft; a slow driving means for power-driving the shaft at a speed materially less than the full speed thereof, said slow driving means constructed to exert on the shaft only a forward driving force, whereby the slow driving means comes into effect automatically when the shaft speed has been retarded to that of the slow driving means, said slow driving means being adjustable into and out of operative condition; and means for adjusting the same into operative condition before the shaft is retarded to the lower speed and for subsequently adjusting the same out of operative condition before the final stoppage.

21. A stop-motion for high speed power driven machines comprising in combination, a retarding means which is normally inoperative but adapted to be rendered operative, when the machine is to be stopped, for quickly reducing the speed of the machine shaft; a slow driving means for power-driving the shaft at a speed materially less than the full speed thereof, said slow driving means constructed to act on the shaft through a connection which is engageable to drive but not to retard the shaft, whereby the slow driving means comes into effect automatically when the shaft speed has been retarded to that of the slow driving means; means for subsequently disengaging the slow driving means at a predetermined point in the shaft's rotation; and means for stopping the shaft in a predetermined final position.

22. A stop-motion for high speed power driven machines comprising in combination, a slow driving means for power-driving the retarded shaft at a speed materially less than the full speed thereof, said slow driving means constructed to act on the shaft through a connection which is engageable to drive but not to retard the shaft, whereby the slow driving means comes into effect automatically when the shaft speed has slowed down to that of the slow driving means; means for subsequently disengaging the slow driving means at a predetermined point in the shaft's rotation; and means for further retarding, and finally stopping, the shaft in a predetermined final position.

23. A driving and stopping mechanism for power driven machines, in combination, a high speed drive; a low speed drive; a driven shaft; a brake on said shaft; means to shift from high to low speed, said means including devices to position the low speed drive for operation; means associated with the low speed drive adapted to prevent the premature actuation of said low speed drive means; means to disengage said low speed drive; and means to stop the shaft at a predetermined angular position.

24. A driving and stopping mechanism for power driven machines, in combination, a high speed drive; a low speed positive drive; a driven shaft; a brake on said shaft; means to shift from high to low speed; means to position said low speed drive means prior to the actuation of said brake; and means associated with the low speed drive means adapted to prevent a premature engagement thereof; means to disengage said low speed drive; and means to thereafter stop the shaft at a predetermined angular position.

25. A driving and stopping mechanism for power driven machines, in combination, a high speed drive; a low speed positive drive; a driven shaft; a brake on said shaft; means associated with said low speed drive means adapted to prevent a premature driving engagement of said low speed drive means; means to disengage said low speed drive means; and means to stop the shaft at a predetermined angular position.

26. A driving and stopping mechanism for power driven machines, in combination, a constantly driven high speed member; a constantly driven low speed member; a driven shaft; a high speed clutch, and a low speed clutch arranged to at times engage their respective speed members; a brake adapted to operate directly upon the shaft independently of said speed members; means to cause the engagement of said low speed member and clutch at a predetermined speed of said shaft whereby said shaft will be driven at a uniform reduced speed in the same direction as the high speed drive; means to disconnect the said low speed drive; and means to thereafter stop the shaft at a predetermined angular position.

Signed by me at Boston, Mass., this 7th day of August, 1916.

AUGUST R. SCHOENKY.

Copies of this patent may be obtained for five cents each, by addressing the "Commissioner of Patents Washington, D. C."